United States Patent [19]
Anjur et al.

[11] Patent Number: 6,038,562
[45] Date of Patent: Mar. 14, 2000

[54] INTERFACE TO SUPPORT STATE-DEPENDENT WEB APPLICATIONS ACCESSING A RELATIONAL DATABASE

[75] Inventors: Vaishnavi Anjur, Emeryville; Atul Chadha, Milpitas; Piyush Goel, Monte Sereno; Balakrishna Raghavendra Iyer, San Jose; Venkatachary Srinivasan, Santa Clara; Steven John Watts, Morgan Hill, all of Calif.

[73] Assignee: International Business Machines Corporation, Armonk, N.Y.

[21] Appl. No.: 08/708,512

[22] Filed: Sep. 5, 1996

[51] Int. Cl.⁷ .................................................. G06F 17/30
[52] U.S. Cl. ............................... 707/10; 707/2; 707/101; 707/202
[58] Field of Search ........................ 345/182.18; 707/10, 707/202, 2, 101

[56] References Cited

U.S. PATENT DOCUMENTS

| | | | |
|---|---|---|---|
| 5,089,954 | 2/1992 | Rago | 707/104 |
| 5,421,004 | 5/1995 | Carpenter et al. | 714/25 |
| 5,544,316 | 8/1996 | Carpenter et al. | 709/300 |
| 5,737,592 | 4/1998 | Nguyen et al. | |
| 5,752,023 | 5/1998 | Choucri et al. | 707/10 |
| 5,903,891 | 5/1999 | Chen et al. | 707/10 |

OTHER PUBLICATIONS

Gray, J. et al., "Transaction Processing: Concepts and Techniques," Chapters 1 & 4, Morgan Kaufman Publishers, Inc., 1993, pp. 3–44 and 159–235.

"Common Gateway Interface," CGI—Common Gateway Interface, cgi@ncsa.uiuc.edu (2 pages).

"The Common Gateway Interface," CGI—Common Gateway Interface, cgi@ncsa.uiuc.edu (3 pages).

"VMARK Software Enters a Web Market with Product for Dynamic Data Access; Provides Web–Based Applications with Database–Independent Access to Existing Data," Business Wire, Dec. 19, 1995. Available in DIALOG File 148: IAC Trade & Industry Database, Accession #08342007 (2 pages).

"Sybase 'Open for Business on the Net': Company Announces Powerful Integration of Databases with Internet Web Sites," PR Newswire, Dec. 6, 1995. Available in DIALOG File 148:IAC Trade & Industry Database, Accession #08315301 (3 pages).

"Informix Offers Solutions for Web Database Connectivity; Informix Web Interface Kits, Strong Ties with Visual Web Tool Vendors Provide Ideal Solutions for Interacting with Web Data," Business Wire, Dec. 4, 1995. Available in DIALOG File 148: IAC Trade & Industry Database (4 pages).

(List continued on next page.)

*Primary Examiner*—Paul R. Lintz
*Attorney, Agent, or Firm*—Gates & Cooper

[57] ABSTRACT

Many web applications require access to a relational database. The requirements of such web applications are different from conventional applications that access a database. Web applications need to have selective recoverability and need to have support for different transaction structures, other than the flat transaction structure of conventional database applications, including nested and chained transactions. To achieve this, an interface between the application and database has the following functional features: 1) the interface to the database is connection oriented, i.e., the connection is retained across several invocations of the application; 2) the backend of the interface is long living, i.e., it exists across multiple invocations; 3) state information about a session in progress is maintained, and more specifically, it is distributed between the backend of the interface and the hidden fields of the HTML output document.

45 Claims, 6 Drawing Sheets

The interface architecture

OTHER PUBLICATIONS

"Spider Technologies and Informix Software Announce a Strategic Partnership to Provide Web/Database Integration and Application Development," Business Wire, Jul. 21, 1995. Available in DIALOG File 148: IAC Trade & Industry Database, Accession #08013092 (2 pages).

"nCUBE Announces Partnership with IT Solutions to Develop World Wide Web Servers for Database Access; nCUBE Systems Speed Information Delivery, Enable Access to Relational Databases Across the Internet," Business Wire, May 2, 1995. Available in DIALOG File 148: IAC Trade & Industry Database, Accession #07825434 (2 pages).

"Sybase and Silicon Graphics Team Up to Provide Solutions for World Wide Web," PR Newswire, Mar. 28, 1995. Available in DIALOG File 148: IAC Trade & Industry Database, Accession #07756695 (3 pages).

"Spider Tools Speeds Database, Web Connections. (Spider Technologies' Spider 1.1 Unix Visual Development Environment)", InfoWorld, v17, n43, p6(1), Oct. 23, 1995. Available in DIALOG File 275:IAC(SM) Computer Database(TM), Accession #01852841.

Garcia–Molina, H. et al., "Sagas" in *Transaction Management*, Chapter 3, 1987, pp. 290–300.

Gray, J., "The Transaction Concept:: Virtues and Limitations," IEEE, 1981, pp. 144–153.

Gray, J., "A Transaction Model," in ICALP 80: Automata, Languages and Programming, vol. 85, Berlin: Springer–Verlag, 1980, pp. 282–298.

FIG. 1: A travel agency application

FIG. 2: The interface architecture

| Factors | | | | Functionality | | |
|---|---|---|---|---|---|---|
| Connection oriented | State preserving | Long living | Sessions | Consistent Database view | Recoverability Complex Structures (with additional logic) |
| N | N | N | N | N | N |
| N | N | Y | N | N | N |
| N | Y | N | Y | N | Y |
| N | Y | Y | Y | Y | N |
| Y | N | N | - | - | - |
| Y | N | Y | Y | Y | N |
| Y | Y | N | - | - | - |
| Y | Y | Y | Y | Y | Y |

FIG. 3: Interfaces for web applications

FIG. 4: Travel agency application

INTERFACE TO SUPPORT STATE-DEPENDENT WEB APPLICATIONS ACCESSING A RELATIONAL DATABASE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to accessing data in a database from a web browser on the internet, and more specifically to a system, method, and program for interfacing web applications, which parse requests from the web browser, to a database management system.

2. Description of the Related Art

The ubiquity of the internet's world wide web has opened up new dimensions for commerce. Previously, electronic transactions were exclusively used by highly sophisticated business enterprises, such as banks, that could afford to (or could not afford not to) use computer controlled communications. Today, the internet can provide the efficiency of electronic transactions among business enterprises and customers at significantly low costs for the medium to small business. The world wide web, and its successors, are viewed as a well accepted standard communications protocol.

The increasing role that the internet is playing in commercial transactions is spawning the development of new database management system applications that are at the heart of these commercial transactions. Data base management systems, the mainstay of book-keeping, for service sensitive transactions and the world wide web are today's foundations for service sensitive electronic transactions.

The requirements of web applications that access a database are different from that of conventional database applications. The "all-or-nothing" semantics of the flat transaction model supported by most commercial database systems is generally adequate for conventional applications. Web applications typically require selective recoverability, i.e., flexibility in deciding what should be committed to the database. Also, web applications can have transaction structures that require a combination of more than one transaction model, e.g. supporting flat, nested and chained transaction models in a transaction structure. A complex transaction structure is defined herein as any transaction structure or combination of transaction structures that includes at least one non-flat transaction structure. For example, see Jim Gray, Andreas Reuter, "Transaction Processing: Concepts and Techniques," Morgan Kaufman Publishers, Inc., 1993, chapters 1 and 4.

As an example, consider a typical travel agency application that allows customers to plan a vacation trip. The customer is given access to the required databases of airline companies, home care and car rental agencies. The whole trip planning activity can be considered a top-level transaction and nested within it are lower-level transactions in the form of accesses to individual agency databases.

Assume that a customer wants to plan an itinerary from city A to city F going through cities B, C, D and E. Also, assume that the customer plans to be away from home whether or not the customer succeeds in finding the right reservations for the itinerary, and wants to request a home care agency to take care of the customer's home during the vacation period. The choice of cities in the itinerary depends on availability of airline and car rental reservations.

Figure 1:
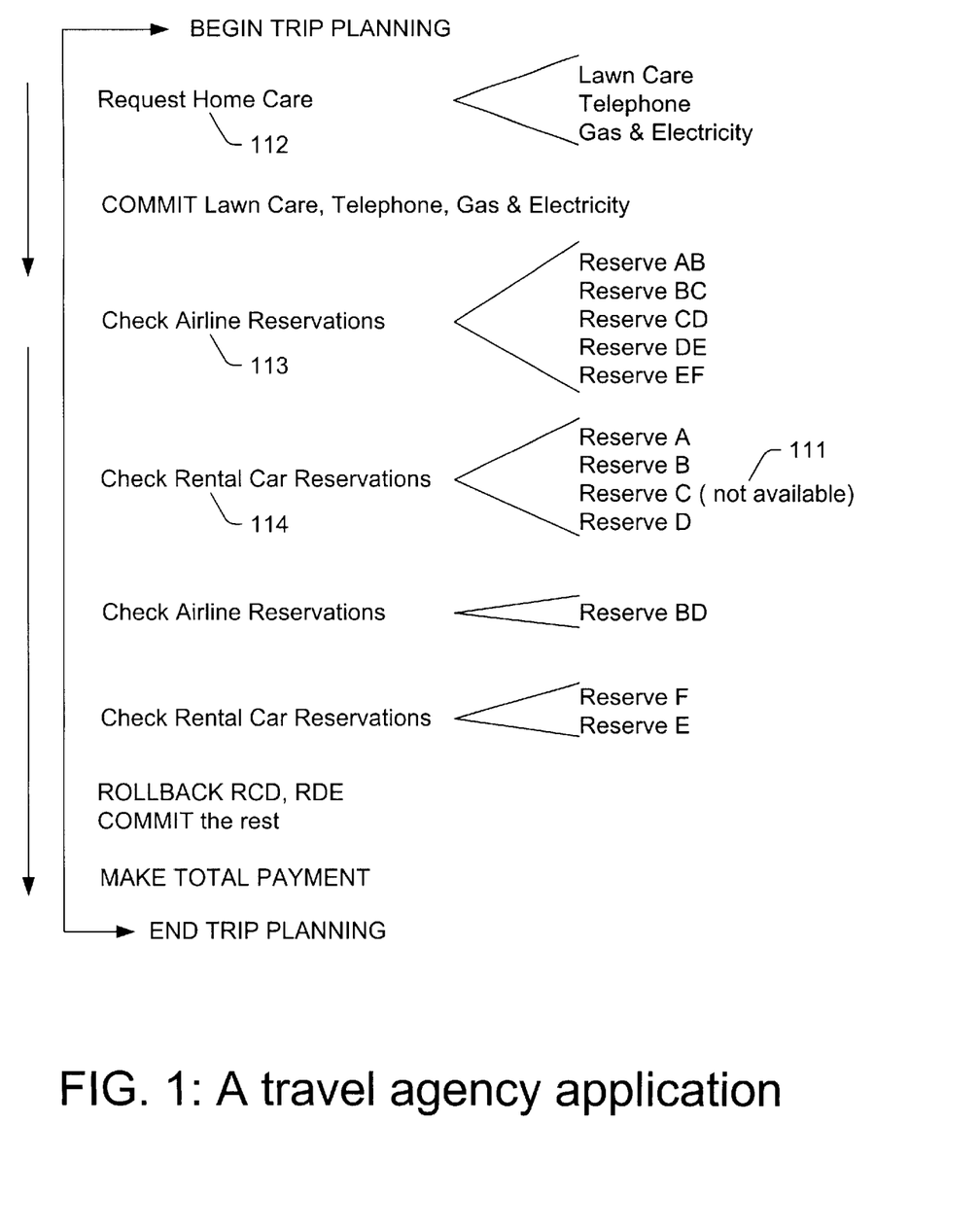
FIG. 1 is an example of a travel agency database application.

FIG. 1 shows a typical transaction structure. At any point (before making the final payment), the customer may chose to cancel the vacation, i.e., rollback all airline and car reservations requested on behalf of the customer. Alternatively, if a car reservation is not available at a city, the customer may chose to drop the city from the itinerary and make an alternate airline reservation.

For example, in FIG. 1, if the customer does not find a car rental reservation at city C, 111, the customer may drop the city from the itinerary and look for an alternate route. The subtransaction 112 in the home care agency database will not be rolled back since the customer intends to be away from home anyway. However, the ongoing subtransaction 113 in the airline database should remain active together with the subtransaction 114 in the car rental database to finalize the itinerary.

To summarize, the overall structure is that of a chained transaction with the subtransaction in the home care agency database forming one part of the chain. The second part of the chain has a nested structure consisting of subtransactions in the airline and car rental agency databases. Within the nested structure, the customer should be given the flexibility of canceling reservations and making new ones i.e., selective recoverability.

Conventional database applications will have application specific logic that is predetermined depending upon the transaction structure of the application. However, with web interfaces, the transaction structure of an application may not be pre-determined. It may be determined by the user by way of the sequence in which actions are requested at the database; and, more specifically, by the order in which hyper-links are selected for navigation.

To support applications similar to the one described above, state information about the application must be maintained. In the example above, state information includes details about the reservations made and what the customer owes to individual agencies. Hence these applications are "state-dependent".

Web applications accessing a database have typically been supported using the Common Gateway Interface (CGI) standard. The Common Gateway Interface (CGI) is a standard for interfacing external applications with information servers, such as HTTP or Web Servers. A Web daemon will execute the CGI program to transmit information to the database engine and to receive the results back for display to the client. Briefly, when a user uses the web browser to access a file in a directory called the CGI-BIN, the file is executed and the results are returned to the web browser (instead of the file itself being returned to the browser). The CGI specifies interaction between a program and a web browser, not the interaction between the program and a database. For example, see "Common Gateway Interface," and "The Common Gateway Interface" CGI-Common Gateway Interface, cgi@ncsa.uiuc.edu.

Every request to the CGI-BIN file causes the file to be executed and the results returned to the browser. Hence, the CGI-BIN file cannot maintain state information between successive invocations. However, the state information can be stored in the hidden fields of the Uniform Resource Locator (URL) that points to the file so that it can be used during successive invocations. This solution is expensive since the amount of state information in the context of applications accessing a database can be large. In such applications, the CGI-BIN file contains SQL commands that connect to the database, execute requests, disconnect from the database and pass the results to the browser.

A typical application is to browse a shopping catalog through the web, where the catalog itself is assumed to be stored in a database. As a customer browses through the catalog, the customer can select items to order. Among the selected items, the customer may further chose to place orders on some items and not to place orders on the rest. Thus the application and its interface to the database should allow the customer to selectively recover some of the selections (i.e., not place orders on some selections) the customer made prior to making the payment. To support recoverability at a later stage, information about all selections should be maintained. Hence state information should be maintained across invocations of the CGI-BIN file.

Application Ser. No. 08/491,742, filed Jun. 19, 1995, entitled "ACCESSING A RELATIONAL DATABASE OVER THE INTERNET USING MACRO LANGUAGE FILES", is an example of an interface for web applications accessing a database. The CGI-BIN program in the interface parses SQL commands in macro language files, connects to the database, executes the commands and returns results to the web browser. Since the program is alive only for the duration of a request, state information cannot be stored in the program.

Since commercial database systems support a flat transaction structure and since the program cannot maintain state information across invocations, applications that have different transaction requirements cannot be supported. An interface that can support all of such applications is previously unknown.

SUMMARY OF THE INVENTION

It is an object of this invention to provide an interface to support applications that require selective recoverability and that require a transaction structure that is a combination of flat, nested and chained transaction models.

It is a further object of this invention to provide an interface for web applications interacting with data in a database wherein the web applications have different requirements in terms of the functional support provided to them.

The system, method, and program of this invention enables a browser to interact with data in a database. A web application is invoked to parse the requests from the browser and to send the parsed requests to an interface backend. The interface backend retains a connection with a database management system across multiple invocations of the web application. The interface backend processes the parsed requests and returns results from the database management system to the web application for display to a user. In processing the parsed requests, the interface backend has the capability to provide different functionality to the application, depending upon the requirements of the application for a given invocation of the application. When required, the interface backend can provide for selective recoverability and can support various transaction structures.

To provide such support, the interface backend can provide the following features: 1) The interface to the database is connection oriented; 2) The backend of the interface is long living; 3) State information about a session in progress is maintained; 4) State information is distributed between the backend and the hidden fields of the HTML output document; 5) The interface supports both recoverable and irrecoverable actions; and 6) The interface supports web applications with structures that cannot be handled by the flat transaction model of database systems.

However, not all of these features are required at all times. For example, some subtransactions within the application may indeed represent a flat transaction which may be handled in a similar way as conventional applications accessing a database. Other applications or subcomponents of an application may require certain features but not others. Some of these optional features include 1) whether a connection with a database is retained across a plurality of invocations of the web application, or whether the connection with the database is established and destroyed every time the web application is invoked; 2) whether there needs to be a transient backend which terminates after every invocation of the web application, or whether there needs to be a long living backend which exists across multiple invocations; and 3) whether or not state information about a session in progress is maintained. Depending upon which of the above functions are provided, and in what combination, the interface of this invention will provide different support for applications with different requirements, such as whether or not there is a need to support a plurality of sessions; whether or not a consistent database view needs to be maintained; and whether or not there is a need for further support for selective recoverability and further support for complex transaction structures.

The same backend of the interface of this invention can dynamically provide various combinations of these optional features, for each session or within a session, in order to meet the requirements of various applications. In addition, the backend of the interface can provide specific functionality in order to support web applications accessing a database requiring selective recoverability and supporting complex transaction structures through additional logic at the backend that is not needed for applications requiring less functionality.

To activate this additional logic in the backend, a web application must indicate, with a keyword prefix, whether an update request, i.e., interaction, is recoverable or irrecoverable, and must identify the scope of an explicit COMMIT request. An explicit ROLLBACK request can be issued to rollback those updates identified as recoverable.

The interface backend parses every update statement. For recoverable updates, the backend maintains an identifier and a compensating update. The identifier is passed back to the application to be used in a subsequent commit or rollback request.

Then, if the application issues an explicit COMMIT request, every recoverable update, in the scope of the COMMIT, having its identifier, is committed. Those recoverable updates not identified with their identifier in the COMMIT request are undone via a corresponding compensating update, if possible. Also, recoverable updates not identified with their identifier in a ROLLBACK request are committed. Otherwise, the identified recoverable updates within the scope of a ROLLBACK request are undone.

In addition, for requests that require an "open cursor" to be maintained, (scrolling over the rows of a large relation) the backend maintains a cache of the rows returned to the application. The backend also prefetches rows in anticipation of future requests, so that such requests can be satisfied from the cache.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Some definitions for terms that are used throughout this document are as follows:

CGI-application: A CGI-application is an application that is invoked by the web browser in order to perform the actions that the user requested. This application is placed in the CGI-BIN directory and is executed (instead of displayed) when the user accesses the file through the web browser. In order to access a database, the application typically contains a SQL program.

Session: A session is defined as a sequence of requests that a user issues to the database. Each request in the sequence can require inputs from the user of the session or can depend on the results from previous requests to the database. A session can be thought of as a conversational transaction in the real world.

HTML document: A HTML document is a HTML file that contains requests to the database. On every invocation, the CGI-application is given one such file from which it reads the requests to be passed on to the database. The CGI-application places state information in the hidden fields, i.e., in fields transparent to a user of the browser, of the HTML document to be used during subsequent invocations.

Interaction: An interaction between a web application and a database typically consists of a sequence of actions. In database terminology these actions can be either retrievals or updates. Interacting with data in a database includes not only the capability of reading the data, but also possibly, but not necessarily, changing the data in the database.

Retrievals: Retrievals are actions that only "read" data from the database.

Updates: Updates are actions that modify data that is stored in the database. Updates can be one of two types: recoverable and irrecoverable.

Recoverable: Recoverable updates can be undone at any time during a session.

Irrecoverable: Irrecoverable updates cannot be undone during a session once they are performed.

Figure 2:
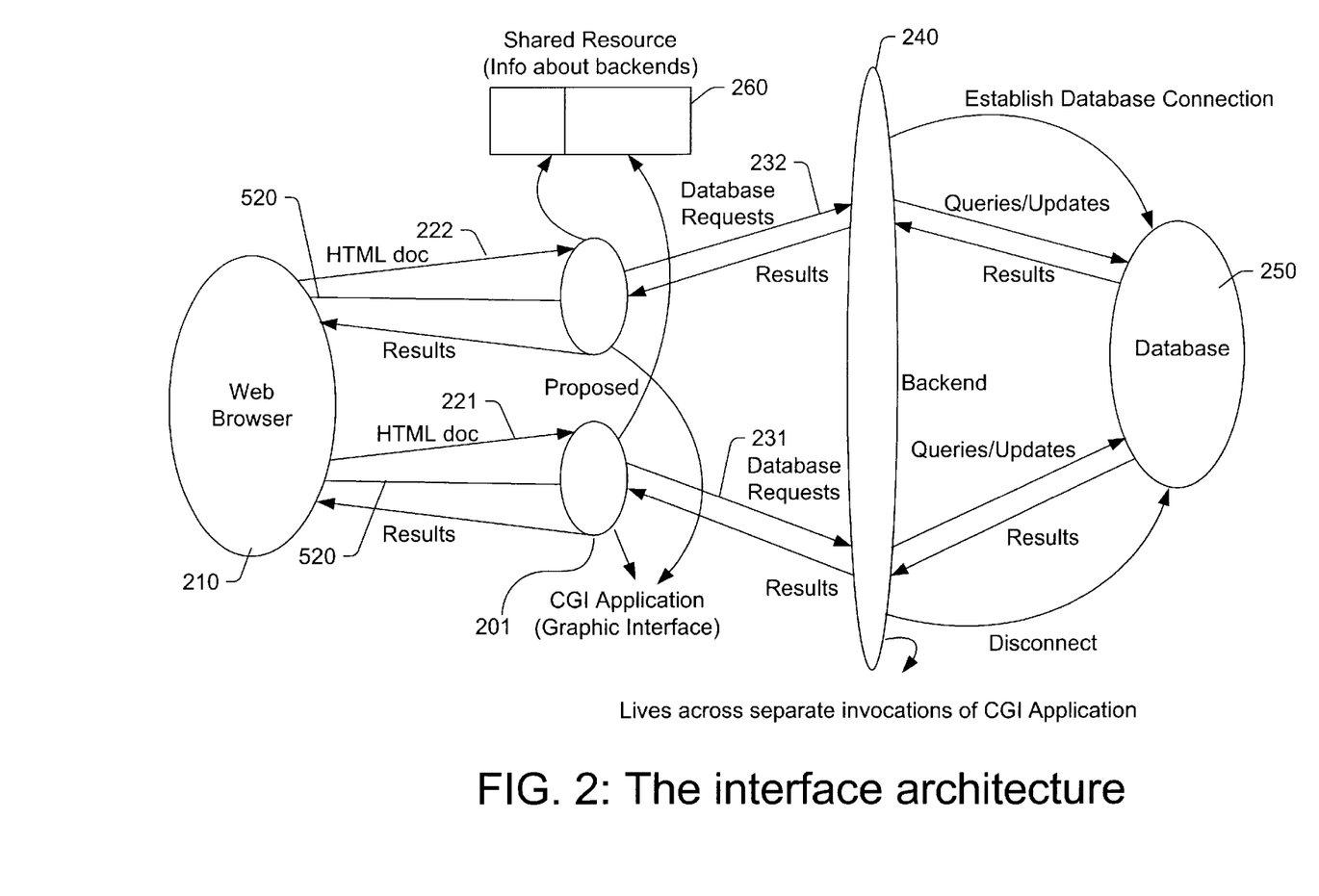
FIG. 2 shows the architecture of the interface between web applications and databases.

The architecture of the interface of this invention is shown in FIG. 2. The frontend of the interface is the CGI-application 201 that parses requests from HTML documents 221, 222 made available to it by the web browser 210. The CGI-application 201 is alive only for the duration of a request. In order to maintain state information across invocations, the CGI-application 201 transmits parsed requests 231, 232 to the backend 240. The interaction between the frontend 201 of the interface and the database 250 takes place through the backend 240. The backend 240 interacts with the database 250 and maintains state information for a session.

The interaction between the frontend 201 of the interface and the database 250 can fall into one of the two categories: 1) connection oriented, or 2) connectionless.

Connection oriented: The connection with the database 250 is retained across several invocations of the CGI-application 201.

Connectionless: The connection with the database 250 is established and destroyed every time the CGI-application 201 is invoked.

The backend 240 itself can be categorized as belonging to one of the following types: transient backend or long living backend.

Transient backend: The backend 240 terminates after every invocation of the CGI-application 201.

Long living backend: The backend 240 exists across multiple invocations.

In order to support the flexibility of selectively recovering updates, some state information about a session should be maintained. State information can be classified into two categories: 1) private, or 2) public.

Private: This contains information about a session in the form of compensating actions for all recoverable actions and information about the database state as perceived by the user.

Public: This contains information about a session in progress (in the form of a session identifier) and a query being executed currently.

The following are examples of different kinds of state information that should be maintained during a session.

1) A user may be browsing through the result of a query during a session. In order to be able to look at small portions of the result each time, the database should maintain an open cursor for the query. Information about the open cursor should be maintained across several invocations of the CGI-application.

2) To support the notion of selective recoverability, compensating updates for all recoverable updates should be maintained.

Features of the Interface

The interface, of this invention, between web applications 201 and databases 250, has the following features in order to provide the requirements of selective recoverability and the support of different transaction models.

First, the interface to the database is connection oriented. During the duration of a session, a user may browse through a very large relation, looking only at a specified number of rows each time. The ideal solution with current database technology is to maintain an open cursor on the relation. If the database connection is to be established each time a specified number of rows is requested, a cursor should be opened at a specified position in the relation for each request. This is very inefficient. Also, if the cursor is to be opened at an isolation level that prevents updates on the relation during the time the cursor is open, it is important to keep the cursor open for a consistent view of the relation. This consistency cannot be guaranteed if the cursor has to be opened each time rows are requested. Hence, the interface to the database is connection oriented.

Second, the backend 240 of the interface must be long living. The CGI standard specifies that the CGI-application 201 be executed every time the user accesses the CGI-application 201. However, the result(s) of the CGI-application are not visible to the user until the program terminates. In order to make the interface to the database connection oriented, the CGI-application 201 must communicate with the backend 240 that retains the connection with the database. The CGI-application 201 could now send the user requests to the backend 240 that in turn interacts with the database 250 and retains the database connection for the duration of a session. To retain the connection with the database, the backend is long-living.

Third, state information about a session in progress must be maintained. During the duration of a single session a user would typically make more than one update. In order to let the user cancel a previous recoverable update, state information about all recoverable updates performed during a session is necessary. Information about open cursors, if any, is also required for efficiency and consistent database view.

Fourth, state information must be distributed between the backend and the HTML document. To illustrate, consider again the situation of a user browsing through a very large relation, looking at a specified number of rows each time. If both the private and public state information is maintained in the HTML document, each request for more rows must be translated into opening a new cursor and determining where the fetch operation must begin. This is clearly very expensive. Hence, the state information should not be maintained entirely in the HTML document.

Neither can the state information be maintained entirely at the backend because the CGI-application must have enough information about a session in progress (such as a session identifier) to interface with the appropriate backend.

Hence, the state information is distributed between the backend and the HTML document. The ideal distribution maintains only the relevant state information at each end. The backend maintains database related state information, including compensating actions for recoverable actions. The HTML document has information about a session in progress. Hence the private state is maintained by the backend, and the public state is maintained in the HTML document.

Fifth, the interface supports both recoverable and irrecoverable actions. To illustrate, consider the scenario where a user would like to purchase goods through the web browser. The user browses through the catalog and selects items to be purchased just as a person would select goods into a shopping cart. However these actions must be recoverable, i.e., the user must be allowed to cancel the selections at any time until the goods are purchased, just as a person is allowed to replace goods back on the shelves in a store. On the contrary, once the user has made the commitment to pay (i.e., give credit card number), all the actions of selecting items must be made irrecoverable in the same session i.e the user should not be allowed to cancel the order. (However, it should be noted that the customer may however initiate a new session for canceling orders.) Since commercial database systems do not provide support to selectively recover updates within a transaction, this support is provided outside of the database system by the interface of this invention.

Sixth, the interface supports web applications with structures that cannot be handled by the flat transaction model of database systems. The travel agency application discussed previously is an example of an application that cannot be supported by the flat transaction model offered by database systems. Hence support for such structures is provided outside of the database in the interface of this invention.

Various embodiments of this invention may include some, but not all of the above described features. These other embodiments may sacrifice some of the interface's flexibility. The necessity of some of the features described above depends upon the design decisions of each web application. To aid designers of web applications in designing an interface suitable for their applications, an identification of the features that could be supported by various design decisions is presented hereinbelow.

Figure 3:
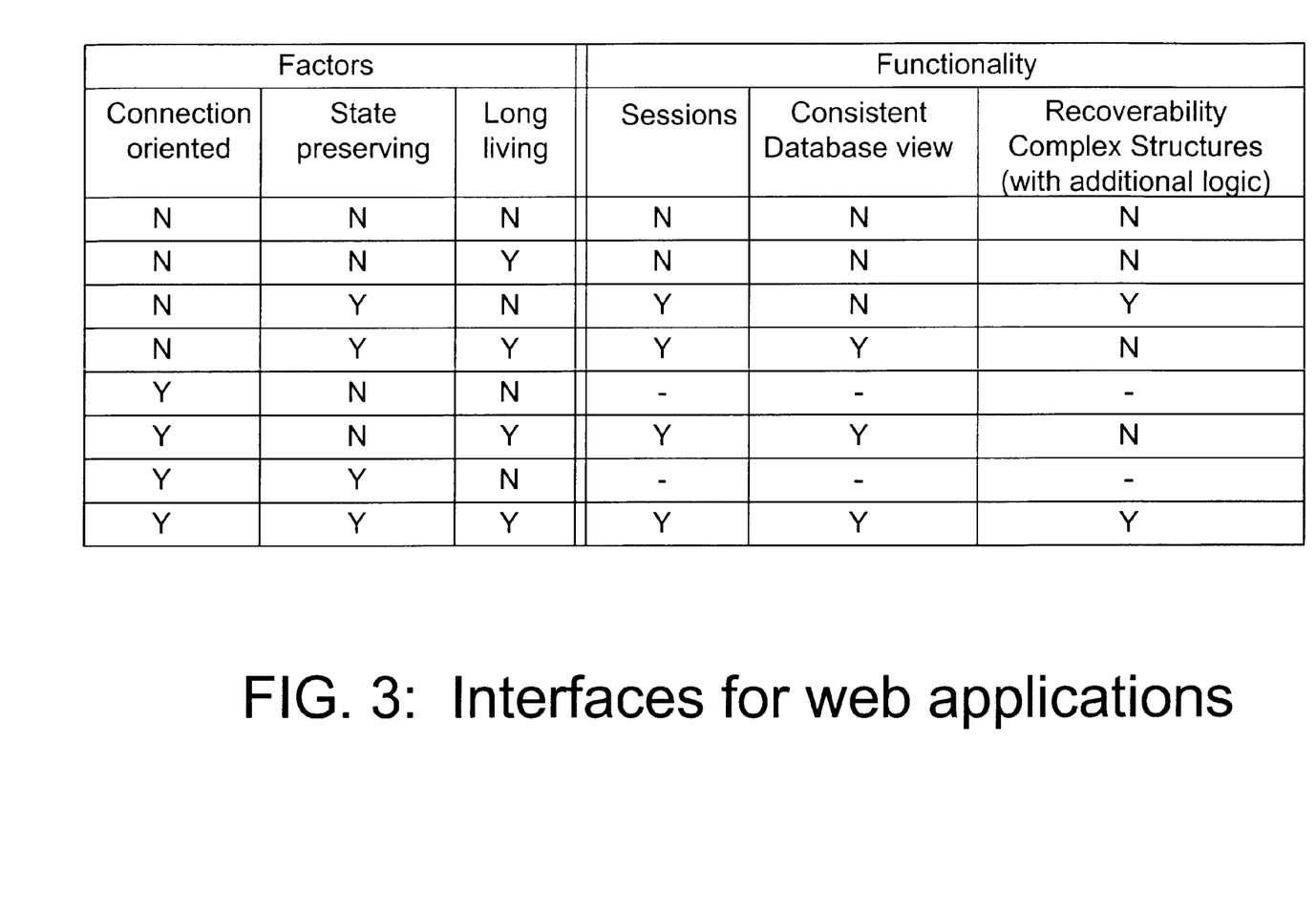
FIG. 3 shows various combinations of the features of the interface of this invention that can be used for various different types of applications having different design criteria.

FIG. 3 shows various combinations of the features of the interface of this invention that can be used for various different types of web applications having different design criteria.

For example, Model 1, 301 can support applications that do not require support for sessions and recoverability. Sessions cannot be supported because the backend is not connection-oriented. Recoverability cannot be supported without state information.

Model 2, 302 is architecturally similar to model 1, 301 and can support exactly the same type of applications as model 1. However, an interface designed based on model 2 may have a minor performance improvement over interfaces based on model 1 since the backend is long living.

With model 3, 303 interfaces, all state information is maintained in the HTML document. This is because the backend is transient. Since status information is available, sessions are still possible. However, since the backend is not connection-oriented, consistent database views cannot be guaranteed. Additional logic to support non-flat transaction structures and recoverability can be added to the backend.

Model 4, 304 supports the same type of applications as model 3. The long living backend can contribute to some minor performance improvement in model 4 interfaces.

The notion of being connection-oriented and having a transient backend do not go together with relational database servers. The process requesting a database connection must remain alive during the duration of the connection. Hence interfaces based on model 5, 305 cannot support web applications accessing a database.

Model 6, 306 interfaces can support sessions, since the backend retains connection with the database during the duration of a session and is long living. No state information is maintained. Hence, selective recoverability cannot be supported.

Interfaces based on model 7, 307 are similar to those based on model 5, 305 and cannot support web applications accessing database servers.

Model 8, 308 guarantees sessions because the backend is long living and maintains connection with the database during the duration of a session. Consistent database views and recoverability can be supported since state information is preserved. Additional logic to support complex application structures can be added to the backend.

Each of the models above describes the functionality or the role that the backend plays during a session. The type of application an interface can support depends on the functionality the backend delivers. The backend can be requested to dynamically alter its role for each session or within the duration of a session. By doing so, the backend provides different functionally to different applications depending on the requirements.

A GENERAL INTERFACE FOR WEB APPLICATIONS USING A DYNAMIC BACKEND

The general interface of this invention, which supports applications having requirements of selective recoverability and non-flat transaction structures, has a backend that can dynamically alter the functionality it delivers depending on the requirements of the session.

At any point during a session, the CGI-application 201 can request the backend 240 to provide the functionality of a particular model described above.

To provide the functionality of selective recoverability and support for transaction structures that are different from the flat transaction structure, backends have additional logic incorporated in them. This is because database systems do not support either of these requirements. However, the following support is required from web applications for the additional logic in the backends to be active.

Program Logic Support in Web Applications:
1. All update requests from the application must be prefixed with a RECOVERABLE or IRRECOVERABLE keyword.
2. An explicit COMMIT request must identify the scope of the COMMIT, (in the form of identifiers of updates at the beginning and end of the scope) and the RECOVERABLE updates to be committed.
3. An explicit ROLLBACK request can be issued to rollback a recoverable update.

When the above logic is activated, the backend initiates two transaction threads-one handle all recoverable updates, "R-thread" and another to handle irrecoverable updates, "IR-thread". The backend parses every update statement to identify the thread that should handle the statement. The R-thread generates and maintains an identifier and a compensating update for every recoverable update. The identifier is passed back to the applications to be used subsequently in an explicit COMMIT or ROLLBACK request.

The scope of a COMMIT/ROLLBACK consists of all the statements occurring after a preceding COMMIT/ROLLBACK up to the current statement. A recoverable update that is in the scope of a COMMIT, but not identified in the request is undone by executing a corresponding compensating update, if possible. Similarly, a recoverable update in the scope of a ROLLBACK but not identified in the request is assumed to be committed.

Thus, the explicit COMMIT and ROLLBACK requests provide for selective recoverability by allowing selection of updates that should be committed (rolled back). The scope associated with the COMMIT/ROLLBACK enables both nested and chain transaction models to be supported.

Figure 4:
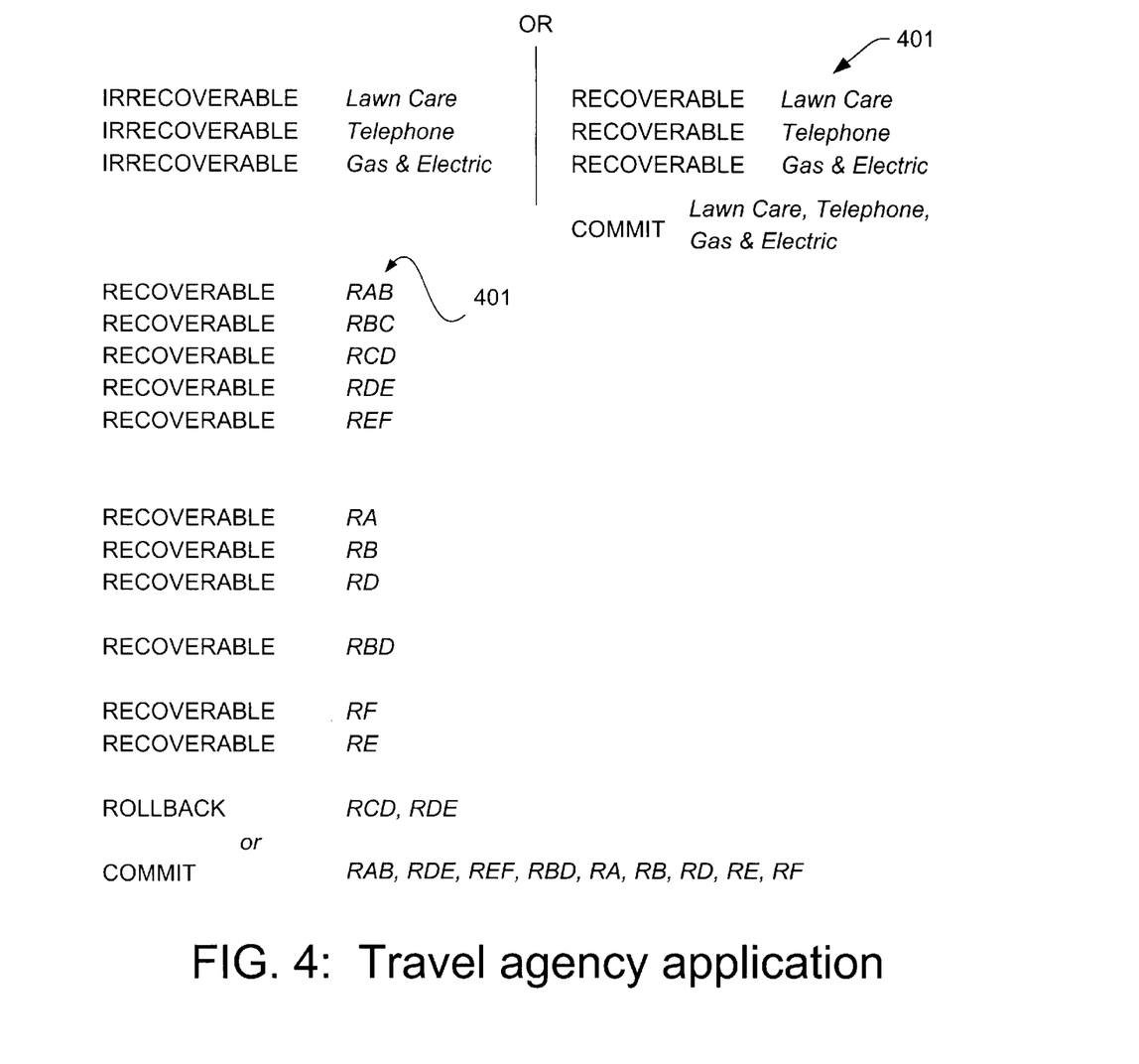
FIG. 4 shows the sequence of update requests in the travel agency application of FIG. 1 for describing an implementation of the interface of this invention.

For a further understanding, FIG. 4 shows the sequence of update requests in the travel agency application of FIG. 1. For the sake of clarity, queries have not been shown in the example. Identifiers 401 (like Lawn Care, RAB, RA, etc.) are update identifiers generated by the backend to be used in an explicit COMMIT request. Updates (RBC, RCD) do not appear in the explicit COMMIT request, and the R-thread compensates for these (RBC, RCD) by issuing compensating updates to the database.

The additional logic for supporting recoverability and non-flat transaction structures is disabled for the duration of the Home-Care agency subtransaction which has a flat structure. The logic is enabled for the other subtransactions which require support for selective recoverability.

It must be noted that the above rules hold only for applications requiring the flexibility of selective recoverability and complex transaction structures. The backend disables the additional logic whenever it is requested to supply the functionality of the model that does not support these requirements.

ARCHITECTURE OF THE GENERAL INTERFACE

As previously discussed, the architecture of the general interface is shown in FIG. 2. A self-describing file, e.g., a HTML document, 221 contains requests to the database 250. The CGI-application 201 parses the document 221 and transmits the requests 231 to an appropriate backend 240. Backends can be requested to provide the functions of any of the eight models discussed earlier. Information about all existing backends and their functionality is available in a file 260 that is shared between CGI-applications. A backend that is part of an ongoing session is said to be "bound" to the session and delivers the functionality the session expects. Otherwise, the backend is "idle".

If the user requests are part of an ongoing session, the CGI-application transmits the requests to the backend that is bound to the session. In the absence of a backend that is bound to a session, either an existing idle backend is requested to provide the required functionality for the new session or a new one is created and bound to the session.

The backend transmits generated identifiers for recoverable updates to the CGI-application. The CGI-application generates session identifiers for new sessions and places update identifiers and session identifiers in the hidden fields, i.e., fields transparent to a user of the browser, of the self-describing file to identify future requests.

For requests that require an "open cursor" to be maintained, (scrolling over the rows of a large relation) the backend maintains a cache of the rows returned to the application. The backend also prefetches rows in anticipation of future requests, so that such requests can be satisfied from the cache.

Connection-oriented backends timeout and disconnect if they are idle for a long time. A CGI-application can cause the backend bound to a session associated with the application to terminate or disconnect with an explicit TERMINATE or DISCONNECT request.

SYSTEM, METHOD, AND PROGRAM OF OPERATION

Figure 5A:
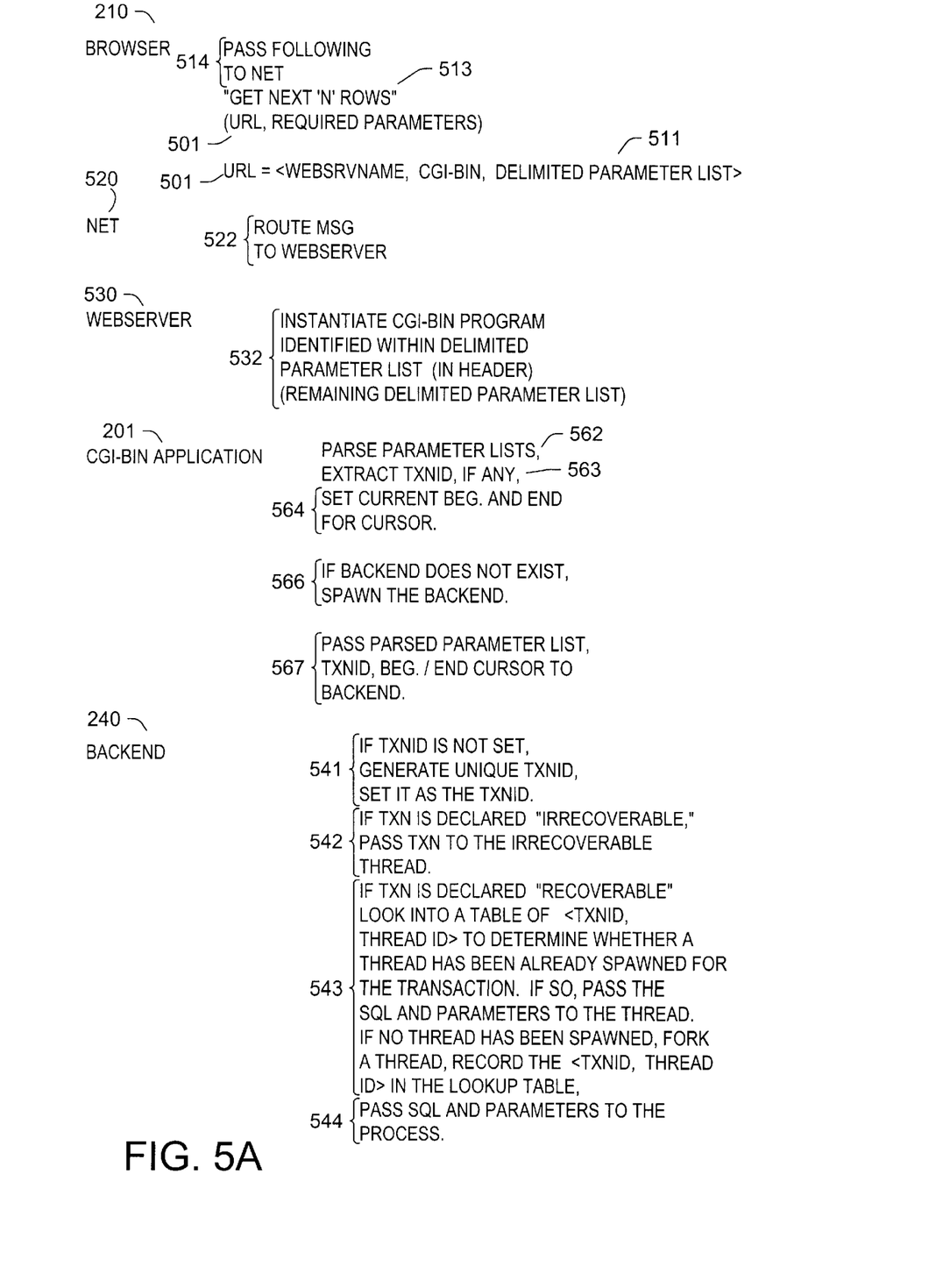
FIG. 5A and 5B is a timing diagram including pseudo code for showing the functionality of a browser, a network, a webserver, a cgi-bin application, the backend interface, and a database management system (DBMS) in carrying out the method, system and program of this invention.
Figure 5B:
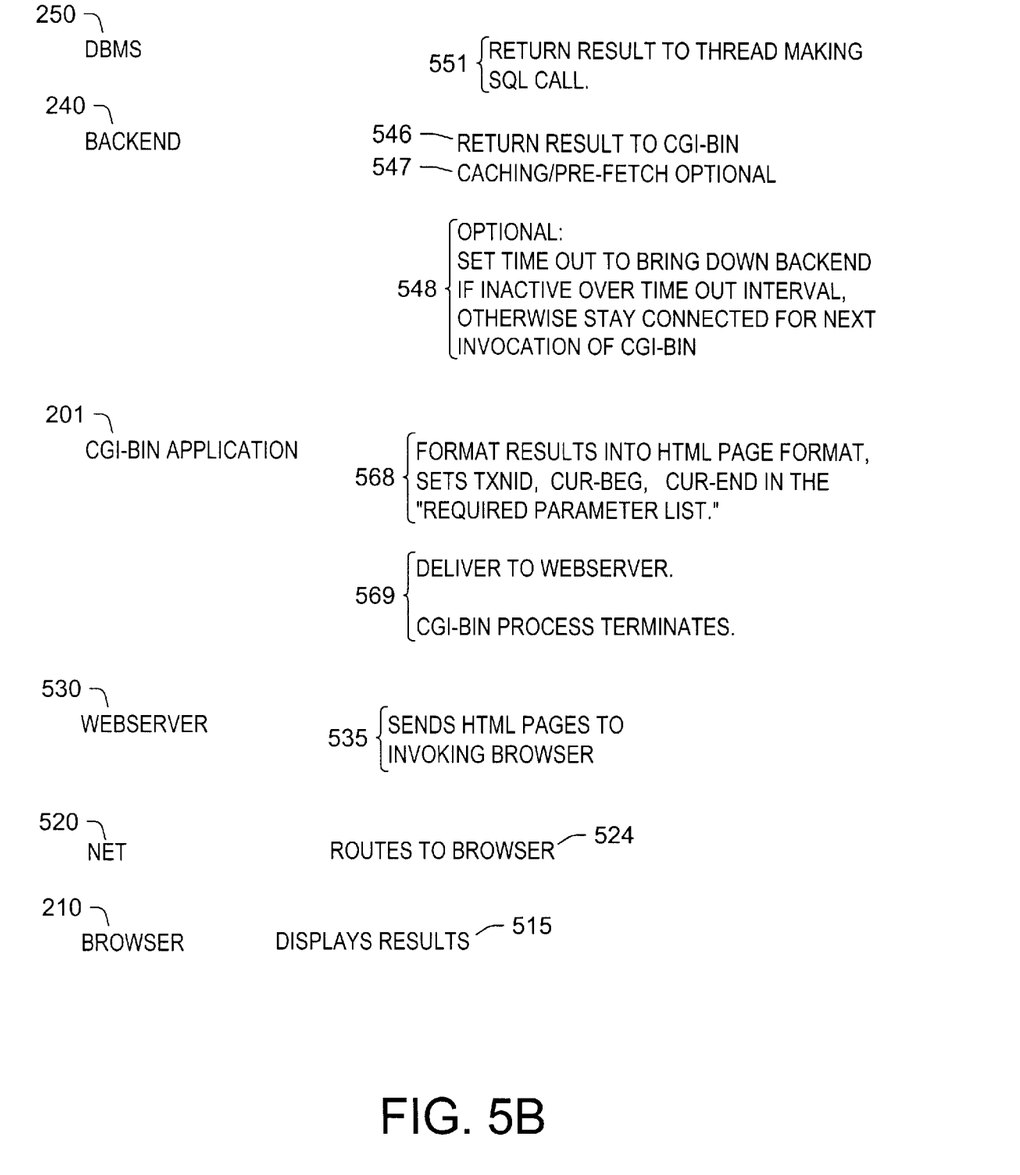

FIG. 5A and 5B is a timing diagram including pseudo code for showing the functionality of a browser 210, a network 520, a webserver 530, a CGI-application 201, the backend interface 240, and a database management system (DBMS) 250 in carrying out the method, system and program of this invention as discussed above.

With reference to FIG. 5A, the browser 210, will send to the webserver 530, via the network 520, the following URL "url=<websrvname, cgi-bin, delimited parameter list>" 501 along with any required parameters 512, step 514. The URL 501 specifies the name of the webserver and the CGI-application. In addition, the URL, through the delimited parameter list 511, can specify object identifiers (ids) for specifying, among other things, SQL statements, form layouts, etc. The required parameters that the browser must send include the transaction identifier (txnid) if one exists, or a null field, i.e., an uninitialized transaction id (txnid) if it is the beginning of a transaction. The transaction id is the means that is used for tying the requests and results together since the browser is transient and does not maintain any state information. In this way, transactional functionality is provided on a connectionless protocol, i.e., the world wide web. As such, atomic work is maintained across multiple connections.

The required parameters 512 may also include compensating SQL statements for recoverable transactions in support of non-flat transaction structures. The required parameters may also specify which language the CGI-application or the self-describing file is written in, thereby supporting multiple browser standards. As such, this invention supports applications or applets written to various formats. The required parameters are embedded in the hidden fields of an HTML document or other self-describing file. As such, various browser standards can be supported based upon the data maintained and exchanged between the browser and the backend interface.

The required parameters may also include cursor position information, e.g., current begin and current end, if there is an open cursor and scrolling is desired. If a row or rows of results have been returned to the browser, and scrolling is desired, the browser will send "EGET NEXT 'N' ROWS" 513 to the webserver. This may be a button that is selected by a user on a browser form. The browser will then send the URL 501 and the required parameters 512.

The network 520 routes all messages, e.g., the "GET NEXT 'N' ROWS", and the URL and the required parameters, to the webserver specified in the URL 501, step 522. The webserver is the front-end of the interface 201 as shown in FIG. 2.

Referring back to FIG. 5A, the webserver 530 instantiates the CGI-program identified in the URL 501 within the delimited parameter list, e.g., in a header, along with the remaining delimited parameters, step 532. The CGI-application can comply with any one of many standards including, but not limited to, Java, C/C++, Fortran, PERL, TCL, any UNIX shell, visual basic, AppleScript, appletts, ODBMS, and/or the various HTML standards.

The CGI-application parses, step 562, the parameter lists, the delimited parameter list 511 specified in the URL including SQL statements and the required parameters 512, using a macro language file applicable to whatever language and/or passing through the CGI-application to a facility, e.g., Java, that interprets the parameters. The use of a macro language file can be one as described in application Ser. No. 08/491,742, filed Jun. 19, 1995, entitled "ACCESSING A RELATIONAL DATABASE OVER THE INTERNET USING MACRO LANGUAGE FILES", herein incorporated by reference. The type of parsing done by a macro language file depends upon the language that the CGI-application was written in. The required parameters 512 in the hidden fields of the self describing file, e.g., a HTML document, can also specify the language of the CGI-application and the a type of parsing to be performed, such as by a specific macro language file.

Also, the CGI-application extracts the transaction id, if there is one, and sets the current begin position and the current end position of the open cursor, steps 563, 564. If a backend does not exist, a backend process is spawned, step 566. Then the parsed parameters, transaction id, and begin/end cursor position are passed to the spawned or pre-existing backend, step 567.

It should be noted that for one backend parent process that has been spawned and is currently existing, there will be one thread spawned for all of the irrecoverable transactions and a separate thread will be spawned for each recoverable transaction. That is, each recoverable transaction will have its own process, i.e., thread.

The backend 240 then performs the following steps. If the transaction id is not set, the backend 240 generates a unique transaction id (txnid), and sets it as the "txnid," step 541. If the transaction is declared "irrecoverable," the transaction is passed to the irrecoverable thread, step 542. If the transaction is declared "recoverable", the backend looks into a table of <txnid, thread id> to determine whether a thread has been spawned for that transaction. If so, the SQL, i.e., the parsed delimited parameter list 511 and the parsed required parameters 512 are passed to the thread. If no thread has been spawned, a thread is forked, and the <txnid, thread id> is recorded in the lookup table, step 543. The parameters 511, 512 are passed to the spawned or pre-existing thread having the corresponding thread id, step 544.

With reference to FIG. 5B, the database management system, DBMS, 250 then returns results to the thread in the backend making the SQL call, step 551.

The backend 240 then returns the results to the CGI-application, step 546. The backend may optionally prefetch from the DBMS and cache a range of rows or additional results that is greater than what was originally requested from the browser (and what will be returned at step 546), step 547. This option is used to improve system performance and reduce time involved in accessing the DBMS whenever a "GET NEXT 'N' ROWS" request is anticipated from the browser. Also, the backend may optionally timeout over a predetermined interval if the backend is inactive for that time interval. If the backend times-out, then it could disconnect from the DBMS 250. Otherwise, it can stay connected for the next invocation of the CGI-application, step 548. There are many other equivalent ways to implement this ability of the backend to stay connected to the DBMS through multiple invocations of the CGI-application. Likewise, by applying general techniques known in the art, one can implement this new ability for the CGI-application to control, based upon the requirements of the CGI-application, whether the backend should be long-living and stay connected to the DBMS over multiple invocations of the CGI-application, or be transient, and be disconnected after an invocation. Also, other means within a webserver may be used to provide CGI-application functionality as discussed herein.

Upon receipt of the results from the backend 240, the CGI-application formats the results into a HTML page or any other self-describing file or format. This can be accomplished through a macro language file such as described in application Ser. No. 08/491,742, filed Jun. 19, 1995, entitled "ACCESSING A RELATIONAL DATABASE OVER THE INTERNET USING MACRO LANGUAGE FILES", herein incorporated by reference. The use of any such macro language file will determine the form the results will be put into. The CGI-application also sets the transaction id (txnid), current begin/end cursor position in the required parameter list 512, step 568. All of these items are sent to the webserver 530 and the cgi-bin process terminates step 569, i.e., the connection between the webserver and the CGI-application and between the CGI-application and the backend is lost. Any additional requests associated with that same transaction will be tied to this transaction through the transaction id (txnid) as if the connection were maintained.

The webserver 530 sends the format, e.g., the HTML pages, to the invoking browser, step 535. Since the browser may have been disconnected from this webserver since step 514, the webserver resolves the identity of the browser via a hidden field of the self-describing file, e.g., a HTML document, which contains the transaction id (txnid). The transaction id (txnid) is essentially the description of the virtual connection between the browser and the DBMS.

The network 520 routes the information from the webserver 530 to the browser 210, step 524. The browser 210 then displays the results to a user, step 515.

Using the foregoing specification, the invention may be implemented using standard programming and/or engineering techniques using computer programming software, firmware, hardware or any combination or subcombination thereof. Any such resulting program(s), having computer readable program code means, may be embodied within one or more computer usable media such as fixed (hard) drives, disk, diskettes, optical disks, magnetic tape, semiconductor memories such as ROM, Proms, etc., or any memory or transmitting device, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, cpu, memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, although reference is made to relational databases, other database, including but not limited to object oriented databases may be applicable to this invention. Also, although in a preferred embodiment the browser resides on a first processing system and the webserver, CGI-application, backend, and DBMS reside on a second processing system connected to the first system via a network, these various components could reside within various different combinations of processing systems and network environments.

We claim:

1. A method for interacting with data in a database by a browser through an application frontend interface to a database management system (DBMS), the method comprising:

passing parsed parameters, by the application, of a transaction initiated by a browser, to an interface backend interfacing with the DBMS;

retaining, by the interface backend, a connection with the DBMS across a plurality of invocations of the application; and processing recoverable transactions and irrecoverable transactions by the interface backend whereby a first function of supporting selective recoverability is provided by the interface backend.

2. The method of claim 1 wherein the step of processing recoverable transactions and irrecoverable transactions further comprises:

initiating a separate first transaction thread for each one of a plurality of recoverable updates and a second transaction thread for all irrecoverable updates;

generating and maintaining, by each separate first transaction thread, an identifier and a compensating update for each one of the plurality of recoverable updates; and passing the identifier to the application for subsequent use in a selective recoverability request.

3. The method of claim 2 further comprising:

executing a corresponding compensating update for an unidentified recoverable update in a first scope of the explicit COMMIT request; and executing a commit operation for an unidentified recoverable update in a second scope of the explicit ROLLBACK request.

4. The method of claim 1 whereby a second function of supporting complex transaction structures is provided through an identification of recoverable and irrecoverable transactions within a scope associated with a commit or rollback operation.

5. The method of claim 1 further comprising a step of maintaining, transparently to a user using the browser, data exchanged between the browser and the backend.

6. The method of claim 5 further comprising supporting a plurality of browser standards through a use of the data exchanged between the browser and the backend.

7. The method of claim 1 further comprising a step of identifying each unique transaction with a transaction identifier.

8. A method for interacting with data in a database by a browser through an application frontend interface to a database management system (DBMS), the method comprising:

identifying each unique transaction from an invoking browser with a corresponding transaction identifier;

invoking the application for each transaction from the invoking browser for parsing a plurality of parameters from the transaction;

passing the parsed parameters, by the application, to a backend interface to the database;

processing, by the backend interface, recoverable and irrecoverable transactions whereby a first function of supporting selective recoverability is provided by the interface backend;

maintaining, by the backend interface, a connection with the database across a plurality of invocations of the application to interact with data in the database by using the corresponding transaction identifier for each transaction; and receiving results, generated by the DBMS, of the transaction at the invoking browser based upon the transaction identifier.

9. A method for interacting with data in a database through an application interface to a database management system, the method comprising:

interacting with the data in the database, from the application through a backend interface to a database management system, in a plurality of sessions;

altering, by the backend interface, among a plurality of different functional features provided to the application for each one of the plurality of sessions depending upon a requirement of each one of the sessions; and processing recoverable transactions and irrecoverable transactions by the interface backend whereby a first function of supporting selective recoverability is provided by the interface backend.

10. A method for an application, invoked by a browser, to interact with data in a database, the method comprising:

parsing, by the application, a self-describing file, from the browser, containing a transaction having at least one request to the database;

identifying each transaction with a transaction identifier;

transmitting the parsed file to a backend for interfacing with a database management system and for handling a recoverable update within the transaction;

transmitting back, by the backend, to the application, a generated update identifier for a recoverable update;

inserting, by the application, the transaction identifier and the update identifier in a field of the self-describing file, transparent to the user of the browser, to identify future requests.

11. A method for interacting with data in a database by a browser through an application frontend interface to a database management system DBMS), the method comprising:

identifying each unique transaction from an invoking browser with a corresponding transaction identifier;

passing parsed parameters of a transaction, having a first transaction identifier, from the application to a backend interface having a capability of maintaining a connection with the database management system across a plurality of invocations of the application and a capability of supporting selective recoverability of transactions; and prefetching and caching, by the backend, a plurality of additional rows for the transaction having the first transaction identifier when maintaining an open cursor for the transaction.

12. A method for interacting with data in a database by a browser, the method comprising:

parsing, by a frontend interface, requests from the browser;

transmitting the parsed requests by the frontend interface to a backend interface;

retaining a connection, by the backend, with a database management system (DBMS) across a plurality of invocations of the frontend interface;

distributing state information between the backend and data exchanged between the browser and the backend;

providing support, by the backend, for selective recoverability of a plurality of transactions;

providing support, by the backend, for a complex transaction structure; and providing support, through the data exchanged between the browser and the backend, for various formats of a self-describing file containing the requests from the browser.

13. The method of claim 12 further comprising maintaining an open cursor for a query.

14. The method of claim 12 wherein the step of distributing further comprises maintaining private state information by the backend and maintaining public state information in the data exchanged between the browser and the backend.

15. A method for interacting with data in a database by a browser through an application frontend interface to a database management system, the method comprising:

processing recoverable transactions and irrecoverable transactions by an interface backend whereby a first function of supporting selective recoverability is provided by the interface backend;

dynamically altering at least one function provided by the interface backend to the application interface depending upon at least one requirement of the application interface;

supporting scrollable cursors by maintaining an open cursor at the interface backend; and pre-fetching and caching results of a query that require the open cursor to be maintained.

16. The method of claim 15 wherein the step of pre-fetching and caching further comprises:

maintaining, by the backend, a cache of a plurality of first rows returned to the application interface for maintaining an open cursor;

prefetching, by the backend, into the cache a plurality of second rows in anticipation of future requests; and satisfying, by the backend, a subsequent request, from the application interface, using the cache.

17. A system for interacting with data in a database by a browser through an application frontend interface to a database management system (DBMS), the system comprising:

means for retaining, by a long living interface backend between the application and the DBMS, a connection with the DBMS across a plurality of invocations of the application;

means for maintaining, transparently to a user of the browser, data exchanged between the browser and the backend; and means for activating, via the exchanged data, program logic in the backend to support selective recoverability of interactions.

18. The system of claim 17 further comprising means for activating program logic in the backend to support complex transaction structures.

19. The system of claim 17 further comprising means for interpreting received data from the browser by self-describing fields.

20. A system for interacting with data in a database by a browser through an application interface to a database management system, the system comprising:

a flexible interface backend for receiving parsed interactions from the application interface, the backend interface having a capability to dynamically alter functionality requirements delivered to the application interface based upon at least one requirement of the application interface and a capability of supporting selective recoverability of transactions;

means for supporting a transaction across a plurality of invocations of the application interface;

means for supporting scrollable cursors by maintaining an open cursor at the backend; and means for pre-fetching and caching of a result of a query requiring the open cursor to be maintained.

21. A system for interacting with data in a database by a browser through an application interface to a database management system (DBMS), the system comprising:

means for processing recoverable transactions and irrecoverable transactions by an interface backend interfacing with the DBMS whereby a first function of supporting selective recoverability is provided by the interface backend;

means for interacting with data in the database, from the application interface through a backend interface to the database management system, in a plurality of sessions; and means for altering, by the backend interface, among a plurality of different functional features provided to the application interface for each one of the plurality of sessions depending upon a requirement of the application during each one of the sessions.

22. The system of claim 21 wherein the means for altering provides different functionality within a duration of one of the sessions.

23. The system of claim 21 wherein the different functional features include 1) a connection oriented interaction between the application and the database management system wherein a connection with the database management system is retained across a plurality of invocations of the application interface, 2) a connectionless interaction between the application and the database management system wherein the connection with the database management system is established and destroyed each time the application interface is invoked, 3) means for maintaining state information, 4) means for not maintaining state information, 5) a transient backend interface to the database management system wherein the backend interface terminates after each invocation of the application, and 6) a long living backend interface to the database management system wherein the backend interface exists across multiple invocations.

24. The system of claim 21 wherein the backend interface provides a connectionless interaction and means for not maintaining state information when the application does not require support for a plurality of sessions or recoverability of actions.

25. The system of claim 21 wherein the backend interface provides a connectionless interaction and means for maintaining state information in a self-describing file from the browser when the application requires support for a plurality of sessions without a consistent database view being guaranteed.

26. The system of claim 21 wherein the backend interface provides a connection oriented interaction, means for not maintaining state information, and a long living backend when the application requires support for a plurality of sessions but does not require selective recoverability.

27. The system of claim 21 wherein the backend interface provides a connection oriented interaction, means for maintaining state information, and a long living backend when the application requires support for a plurality of sessions, consistent database views, and recoverability of interactions.

28. The system of claim 27 wherein the means for altering further comprises means for activating additional program logic in the backend when the application has a complex transaction structure.

29. The system of claim 25 wherein the means for altering further comprises means for activating additional program logic in the backend interface when the application has a complex transaction structure and requires selective recoverability.

30. The system of claim 21 wherein the means for altering further comprises means for enabling additional program logic in the backend when a subtransaction in the application has a complex transaction structure or requires selective recoverability and means for disabling the additional program logic code in the backend for a duration of a second subtransaction when the second subtransaction has a flat transaction structure.

31. A system for interacting with data in a database by a browser through an application interface to a database management system, the system comprising:
   a self-describing file containing a set of requirements of the application interface and at least one interaction to the database;
   a flexible interface backend having a capability to provide different functionality to the application interface depending upon the set of requirements of the application;
   means for parsing the self-describing file, by the application interface, and transmitting each parsed interaction to an appropriate process in the backend; and
   means for binding the appropriate backend process to a session to deliver the functionality required by the session.

32. The system of claim 31 further comprising:
   means for transmitting back, by the backend interface, to the application interface, a generated update identifier for a recoverable update;
   means for generating, by the application, a session identifier for a new session;
   means for inserting the session identifier and the update identifier in a field, transparent to a user of the browser, of the self-describing file to identify future interactions.

33. The system of claim 31 further comprising:
   means for maintaining, by the backend interface, a cache of a plurality of first rows returned to the application interface if an open cursor is to be maintained;
   means for prefetching, by the backend, a plurality of second rows in anticipation of future interactions; and
   means for satisfying a subsequent interaction from the cache.

34. A system for interacting with data in a database by a browser, the system comprising:
   an application interface frontend for parsing requests contained within a self-describing file generated from the browser;
   means for sending the parsed requests by the interface frontend to a backend interface;
   means for retaining a connection, by the backend interface, with a database management system across a plurality of invocations of the interface frontend;
   means for providing support, through data exchanged between the browser and the backend, for various formats of the self-describing file;
   means for distributing state information between the backend interface and the data exchanged between the browser and the backend;
   means for providing for selective recoverability of a plurality of transactions; and
   means for providing support for a complex transaction structure.

35. The system of claim 34 further comprising means for maintaining, by a database, an open cursor for a query.

36. The system of claim 34 wherein private state information is maintained by the backend and public state information is maintained in the data exchanged between the browser and the backend interface.

37. A program interface on a computer usable medium comprising:
   means for retaining a connection to a database management system across a plurality of invocations of an application which parses requests from a browser for interacting with data in a database; and
   means for processing recoverable updates selectable from the browser whereby a first function of supporting selective recoverability is provided by the interface backend.

38. A program interface on a computer usable medium comprising:
   means for retaining a connection to a database management system (DBMS) across a plurality of invocations of an application which parses requests from a browser for interacting with data in a database;
   means for dynamically altering among a plurality of functions provided to the application depending upon at least one requirement of the application during a session; and means for processing recoverable transactions and irrecoverable transactions by an interface backend interfacing with the DBMS whereby a first function of supporting selective recoverability is provided by the interface backend.

39. The program interface of claim 38 wherein the means for altering further comprises means for activating program code when the application has a complex transaction structure and requires selective recoverability.

40. The program interface of claim 38 wherein the plurality of functions include 1) a connection oriented interaction between the application and the database management system wherein a connection with the database management system is retained across a plurality of invocations of the application, 2) a connectionless interaction between the application and the database management system wherein the connection with the database management system is established and destroyed each time the application is invoked, 3) means for maintaining state information, 4) means for not maintaining state information, 5) a transient backend interface to the database wherein the backend terminates after each invocation of the application, and 6) a long living backend interface to the database wherein the backend exists across multiple invocations.

41. The program interface of claim 38 further comprising:
means for initiating a separate first transaction thread to handle each one of at least one recoverable updates and a second transaction thread to handle all of at least one irrecoverable updates;
means for generating and maintaining, by each separate first transaction thread, an identifier and a compensating update for each one of the at least one recoverable updates; and
means for passing the identifier to the application for subsequent use in a selective recoverability request.

42. The program interface of claim 41 further comprising:
means for executing a corresponding compensating update for an unidentified recoverable update in a first scope of an explicit COMMIT request; and
means for executing a commit operation for an unidentified recoverable update in a second scope of an explicit ROLLBACK request.

43. The program interface of claim 42 whereby the explicit COMMIT and ROLLBACK requests allow selection of updates that are to be committed or rolled backed for selective recoverability.

44. The program interface of claim 42 whereby the first scope and second scope enables support for nested and chained transaction structures.

45. A program interface on a computer usable medium, comprising:
means for processing recoverable transactions and irrecoverable transactions by an interface backend interfacing with a database management system whereby a first function of supporting selective recoverability is provided by the interface backend;
means for dynamically altering among a plurality of functions provided to an application, which parses requests from a browser for interacting with data in a database, depending upon at least one requirement of the application;
means for supporting scrollable cursors by maintaining an open cursor; and
means for pre-fetching and caching results of a query that require the open cursor to be maintained.

* * * * *

UNITED STATES PATENT AND TRADEMARK OFFICE
CERTIFICATE OF CORRECTION

PATENT NO. : 6,038,562  
DATED : March 14, 2000  
INVENTOR(S) : Vaishnavi Anjur, Atul Chadha, Piyush Goel, Balakrishna Raghavendra Iyer, Venkatachary Srinivasan and Steven John Watts It is certified that error appears in the above-identified patent and that said Letters Patent is hereby corrected as shown below:

Title page,
Item [56], References Cited,
U.S. PATENT DOCUMENTS, add the following:

| | | | |
|---|---|---|---|
| 5,065,311 | 11/1991 | Masai et al. | 395/182.18 |
| 5,317,727 | 05/1994 | Tsuchida et al. | 707/2 |
| 5,333,314 | 07/1994 | Masai et al. | 707/202 |
| 5,457,797 | 10/1995 | Butterworth et al. | 395/682 |
| 5,542,078 | 07/1996 | Martel et al. | 707/101 |

OTHER PUBLICATIONS, add the following:
Frost, Lyle, "Bridging Networks (Using Transmission Control Protocol Internet Protocol with UNIX) (TCP/IP and Networks)", UNIX Review, Vol. 9, No. 5, May, 1991, p. 46-52.

Column 9,
Line 19, "threads-one" should read -- threads: one --.

Signed and Sealed this

Second Day of April, 2002

*Attest:*

JAMES E. ROGAN
*Attesting Officer*  *Director of the United States Patent and Trademark Office*